UNITED STATES PATENT OFFICE.

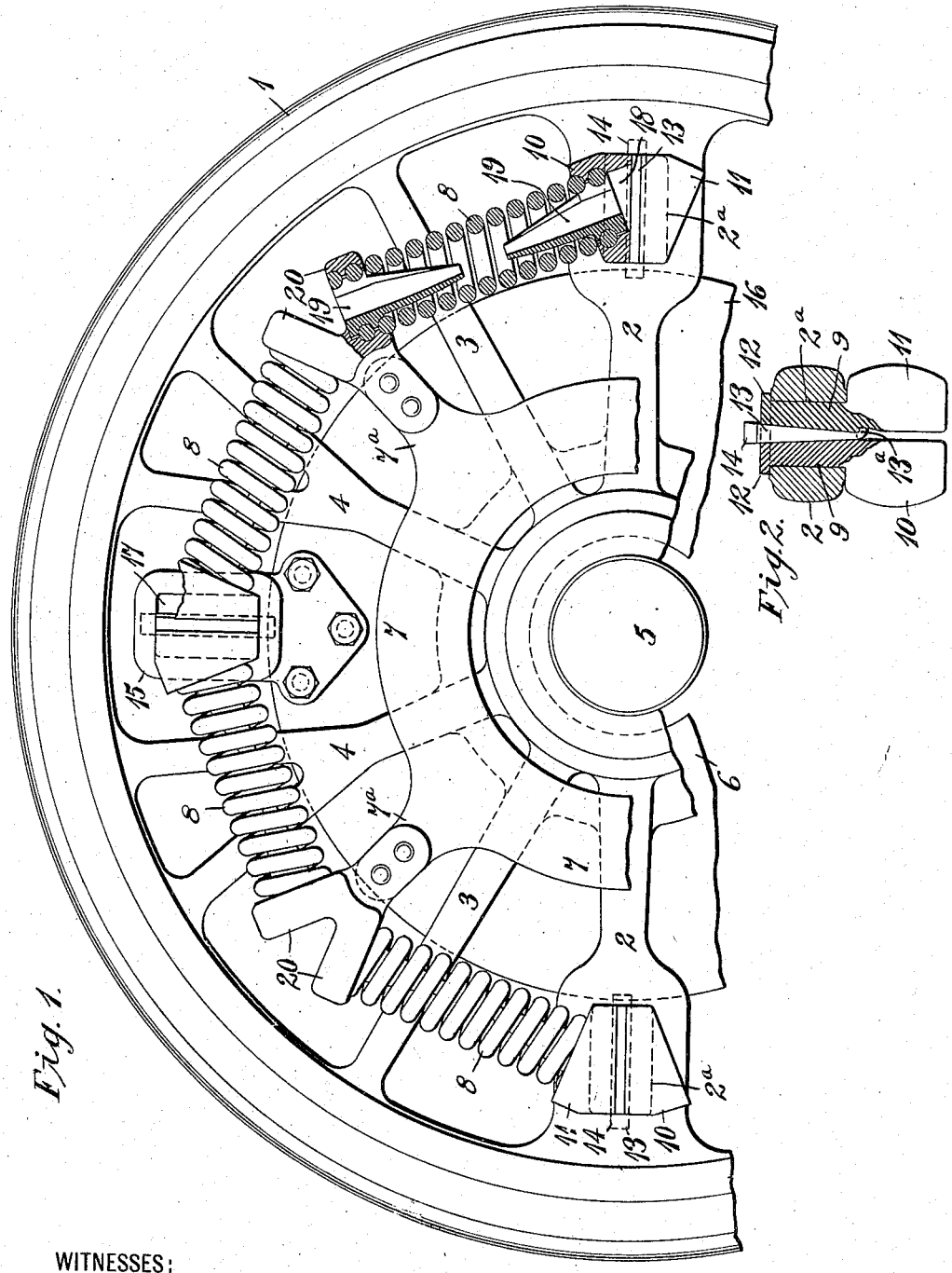

GEORGE M. EATON, OF WILKINSBURG, PENNSYLVANIA, ASSIGNOR TO WESTINGHOUSE ELECTRIC & MANUFACTURING COMPANY, A CORPORATION OF PENNSYLVANIA.

RESILIENT DRIVING CONNECTION.

937,291.

Specification of Letters Patent. Patented Oct. 19, 1909.

Application filed January 11, 1909. Serial No. 471,646.

*To all whom it may concern:*

Be it known that I, GEORGE M. EATON, a citizen of the United States, and a resident of Wilkinsburg, in the county of Allegheny and State of Pennsylvania, have invented a new and useful Improvement in Resilient Driving Connections, of which the following is a specification.

My invention relates to resilient or yielding driving connections, and it has for its object to provide a connection of this character that is simple and durable in construction and is adapted to be interposed between a quill or sleeve, on which an electric driving motor is mounted, and the truck axle of the locomotive or other vehicle propelled by the motor.

When the driving motors of electric locomotives are mounted concentrically with the truck axles, it is specially advantageous to provide a resilient or yielding connection between the motor armatures and the vehicle wheels in order to minimize the strains imposed upon the track and upon the vehicle structure by irregularities in the road bed.

According to my present invention, I provide a floating ring and a plurality of helical springs tangentially arranged end to end in the form of a polygon, one end of each spring being connected to a projection on the floating ring and the free ends of alternate springs being connected, respectively, to projections on the quill and to spokes of the wheel.

Figure 1 of the accompanying drawing is a view, partially in elevation and partially in section, of a portion of a wheel and resilient driving connections constructed in accordance with my invention, and Fig. 2 is a detail view showing a preferred means for detachably connecting spring grips to projections on the quill and on the wheel.

Referring to the drawings, the matter illustrated comprises a wheel 1, having a plurality of spokes 2, 3 and 4, an axle 5, a quill 6 surrounding the axle, a floating ring 7 and a plurality of tangentially disposed helical springs 8 that support the floating ring and are interposed between the quill and the wheel, as hereinafter set forth. The spokes 2 of the wheel 1 are provided with recesses 2ª to receive shanks or projections 9 that extend laterally from a pair of spring grips 10 and 11 to which the adjacent ends of two of the springs are secured. The projections 9 are provided with flanges 12 which engage one side of the spokes 2 at the edge of the recess 2ª when the spring grips are in position and when they are separated by a wedge 13 as shown in Fig. 2 of the drawings. The dimensions of the recess 2ª and the size of the flanges 12 on the projections 9 are such that the projections must be inserted in the recess one at a time and their adjacent surfaces are beveled slightly to accommodate them to the taper wedges 13. The wedges 13 are provided with ears 14 by which they may be withdrawn when it is necessary to knock down the connection. The small end of each wedge, as indicated at 13ª, is bent over, after it is in position, to prevent it from becoming accidentally loosened. A plurality of brackets 15 are secured to a flange 16 of the quill 6 and are provided with recesses 17 which correspond to the recesses 2ª in the spokes 2. The springs may be secured to the grips by any suitable means, the structure illustrated and described in a copending application, Serial No. 426,344, filed April 10, 1908, by John F. Webster, and assigned to the Westinghouse Electric & Mfg. Co., being considered preferable.

In accordance with the Webster structure referred to above, the spring grips 10 are provided with holes 18 to receive the ends of the springs, and plugs 19 are screwed into the ends of the springs after they are in place to clamp them in position, the inner surfaces of the spring grips and the outer surfaces of the plugs being provided with helical grooves which conform to the contour of the springs.

The floating ring 7 is provided with a plurality of ears 7ª to which bifurcated spring grips 20 are secured. The grips 20 are adapted to receive adjacent ends of two springs in a manner similar to the spring grips 10 and 11 and are also provided with plugs 19. The brackets 15 and the spokes 2 of the wheel 1 are equal in number and are uniformly spaced about the axis of the wheel, the brackets being midway between the spokes 2. The projections 20 on the floating ring 7 are uniformly disposed about the axis of the wheel, but there are twice as many as there are brackets 15, the projections 20 being interposed between the brackets and the spokes 2. By utilizing the floating ring, a greater flexibility is obtained in the connection, but it will be readily understood that the other novel features referred to are not limited in their application to resilient connections embodying floating rings.

I desire that only such limitations in the scope of my invention shall be imposed as are indicated in the appended claims.

I claim as my invention:

1. A resilient driving connection comprising a rotatable driving member, a driven member, a floating ring and two sets of springs respectively interposed between the driving member and the ring and the driven member and the ring.

2. A resilient driving connection comprising a rotatable driving member, a driven member, a floating ring and two sets of springs tangentially arranged and respectively establishing connections from the ring to the driving member and to the driven member.

3. A resilient driving connection comprising a driving wheel, a sleeve or quill concentric with the axis of the wheel having radial projections extending between the wheel spokes, a floating ring and helical springs tangentially interposed between the ring and the projections and between the ring and the wheel spokes.

4. A driving connection comprising a driving member, a driven member having radial projections and helical springs tangentially arranged and interposed between the projections and the driving member, spring grips secured to the ends of the springs, and shank projections extending through recesses in the projections, and means for securing the shank projections of two spring grips in each recess.

5. A driving connection comprising a driving member, a driven member having radial projections and helical springs tangentially arranged and interposed between the projections and the driving member, spring grips secured to the ends of the springs and shank projections extending through recesses in the projections, and a taper wedge for securing the shank projections of two spring grips in each recess.

In testimony whereof, I have hereunto subscribed my name this 21st day of December, 1908.

GEORGE M. EATON.

Witnesses:
R. J. DEARBORN,
BIRNEY HINES.